[12] United States Patent
Zhamu et al.

(10) Patent No.: US 8,696,938 B2
(45) Date of Patent: Apr. 15, 2014

(54) SUPERCRITICAL FLUID PROCESS FOR PRODUCING NANO GRAPHENE PLATELETS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1039 days.

(21) Appl. No.: 12/229,493

(22) Filed: Aug. 25, 2008

(65) Prior Publication Data

US 2010/0044646 A1    Feb. 25, 2010

(51) Int. Cl.
*C01B 31/04*    (2006.01)
*C04B 14/00*    (2006.01)

(52) U.S. Cl.
USPC ............... 252/378 R; 252/502; 423/445 R; 423/448; 977/755; 977/900

(58) Field of Classification Search
USPC ....... 252/500–511, 378 R; 423/445 R–447.3, 423/448; 977/755, 900
See application file for complete search history.

(56) References Cited

U.S. PATENT DOCUMENTS

| | | |
|---|---|---|
| 2,798,878 A | 7/1957 | Hummers |
| 4,987,175 A | 1/1991 | Bunnell, Sr. |
| 5,019,446 A | 5/1991 | Bunnell, Sr. |
| 5,186,919 A | 2/1993 | Bunnell, Sr. |
| 5,330,680 A | 7/1994 | Sakawaki et al. |
| 6,287,694 B1 | 9/2001 | Zaleski et al. |
| 6,596,396 B2 | 7/2003 | Hirata et al. |
| 6,828,015 B2 | 12/2004 | Hirata et al. |
| 6,872,330 B2 | 3/2005 | Mack et al. |
| 7,071,258 B1 | 7/2006 | Jang et al. |
| 7,105,108 B2 | 9/2006 | Kaschak et al. |
| 7,157,517 B2 | 1/2007 | Gulari et al. |
| 2002/0054995 A1 | 5/2002 | Mazurkiewicz |
| 2003/0129305 A1 | 7/2003 | Wu et al. |
| 2004/0034151 A1* | 2/2004 | Kaschak et al. ............. 524/495 |
| 2005/0014867 A1* | 1/2005 | Gulari et al. ............... 523/215 |
| 2006/0235128 A1* | 10/2006 | Wang et al. ................ 524/445 |
| 2008/0255294 A1* | 10/2008 | Yerushalmi-Rozen ....... 524/495 |
| 2010/0074835 A1* | 3/2010 | Mercuri ..................... 423/448 |

OTHER PUBLICATIONS

Tomasko et al. "Supercritical fluid applications in polymer nanocomposites." Cur. Opin. in Solid State & Mater. Science. vol. 7, pp. 407-412, 2003.*
Hussain et al. "Review article: Polymer-matrix nanocomposites, processing, manufacturing, and application: An Overview." J. of Composite Materials. vol. 40, No. 17, pp. 1511-1575, 2006.*
U.S. Appl. No. 11/442,903, filed Jun. 26, 2006, B. Z. Jang.
U.S. Appl. No. 10/858,814, filed Jun. 3, 2004, B. Z. Jang, et al.

(Continued)

*Primary Examiner* — Tri V Nguyen (57) ABSTRACT

The present invention provides a process for producing pristine or non-oxidized nano graphene platelets (NGPs) that are highly conductive. The process comprises: (i) subjecting a graphitic material to a supercritical fluid at a first temperature and a first pressure for a first period of time in a pressure vessel and then (ii) rapidly depressurizing the fluid at a fluid release rate sufficient for effecting exfoliation of the graphitic material to obtain the NGP material. Conductive NGPs can be used as a conductive additive in transparent electrodes for solar cells or flat panel displays (e.g., to replace expensive indium-tin oxide), battery and supercapacitor electrodes, and nanocomposite for electromagnetic wave interference (EMI) shielding and static charge dissipation, etc.

16 Claims, 5 Drawing Sheets

(56) References Cited

OTHER PUBLICATIONS

U.S. Appl. No. 11/007,614, filed Dec. 7, 2006, V. Petrik.
U.S. Appl. No. 11/363,336, filed Jun. 27, 2006, L. T. Drzal, et al.
U.S. Appl. No. 11/361,255, filed Feb. 24, 2006, L. T. Drzal, et al.
U.S. Appl. No. 10/659,577, filed Sep. 10, 2003, L. T. Drzal, et al.
U.S. Appl. No. 11/243,285, filed Oct. 4, 2005, J. D. Udy.
U.S. Appl. No. 11/249,404, filed Oct. 14, 2005, R. Prud'Homme.
U.S. Appl. No. 11/800,728, filed May 8, 2007, A. Zhamu, et al.
U.S. Appl. No. 11/526,489, filed Sep. 26, 2006, B. Z. Jang, et al.
Novoselov, K. S., et al. Electric field effect in atomically thin carbon films. Science 306, 666-669 (2004).
Novoselov, K. S., et al. Two dimensional atomic crystals. Proc. Natl. Acad. Sci. 102, 10451-10453 (2005).
McAllister, M. J., et al. Single sheet functionalized graphene by oxidation and thermal expansion of graphite. Chem. Materials 19(18), 4396-4404 (2007).
Li, J. L., et al. Oxygen-driven unzipping of graphitic materials. Phys. Rev. Lett. 96, 176101-1-4 (2006).
Schniepp, H. C., et al. Functionalized single graphene sheets derived from splitting graphite oxide. J. Phys. Chem. B110, 8535-8547 (2006).
Li, X., Wang, X., Zhang, L., Lee, S. & Dai, H., Chemically derived, ultrasmooth graphene nanoribbon semiconductor. Science 319, 1229-1232 (2008).
Bor Z. Jang and A Zhamu, "Processing of Nano Graphene Platelets (NGPs) and NGP Nanocomposites: A Review," J. Materials Sci. 43 (2008) 5092-5101.
Horiuchi, S., et al. Single graphene sheet detected in a carbon nanofilm. Appl. Phys. Lett. 84, 2403-2405 (2004).
Liu, P. & Gong, K. Synthesis of polyaniline-intercalated graphite oxide by an in situ oxidative polymerization reaction. Carbon 37, 706-707 (1999).
Dekany, I., Kruger-Grasser, R. & Weiaa, A. Selective liquid sorption properties of hydrophobized graphite oxide nanostructures. Colloid Polymer Sci. 276, 570-576 (1998).
Chen, G. H. Preparation and characterization of graphite nanosheets from ultrasonic powdering technique. Carbon 42, 753-759 (2004).
Matsuo, Y.,et al. Preparation and characterization of polyvinyl alcohol)- and Cu(OH) 2-poly(vinyl alcohol)-intercalated graphite oxides. Chem. Materials 10, 2266-2269 (1998).
Du, X. S., et al. Direct synthesis of poly(arylene disulfide)/carbon nano-sheet composites via the oxidation with graphite oxide. Carbon 43, 195-213 (2005).
Matsuo, Y., Tahara, K. & Sugie, Y. Synthesis of poly(ethylene oxide)-intercalated graphite oxide. Carbon 34, 672-674 (1996).
Kotov, N. A., et al. Ultrathin graphite oxide-polyelectrolyte composites prepared by self-assembly: transition between conduc and nonconduc.,Adv. Mater. 8, 637-641 (1996).
Matsuo, Y., Tahara, K. & Sugie, Y. Structure and thermal properties of poly (ethylene oxide)-intercalated graphite oxide. Carbon 35 (1), 113-120 (1997).
Kovtyukhova,N. I. et al. Layer-by-layer assembly of ultrathin composite films from micron-sized graphite oxide sheets and polycations. Chem. Mater. 11, 771-778 (1999).
Szabo, T., et al. Composite graphitic nanolayers prepared by self-assembly between finely dispersed graphite oxide and a cationic polymer. Carbon 43, 87-94 (2005).
Stankovich, S. Stable aqueous disp. of graph nanoplatelets via the reduc of exfoliated GO in the presence of poly(sodium 4-styrenesulfonate) J.Mat. Chem.16, 155-158 (2006).
Stankovich, S., Piner, R. D., Nguyen, S. T. and Ruoff, R. S. Synthesis and exfoliation of isocyanate-treated graphene oxide nanoplatelets. Carbon 44, 3342-3347 (2006).
Lu, X. K., Yu, M. F., Huang, H., & Ruoff, R. S. Tailoring graphite with the goal of achieving single sheets. Nanotechnology 10, 269-272 (1999).
X.Yang, X. Dou, A. Rouhanipour, L. Zhi, H. J. Raider, and K. Mullen, "Tow-dimensional Graphene Nano-ribbons," J. Am. Chem. Soc. 130 (2008) 4216-17.
H. A. Becerril, et al, "Evaluation of Solution-Processed Reduced Graphene Oxide Films as Transparent Conductors," ACS Nano 2 (2008) 463-470.
X. Wang, L. Zhi, and K. Muellen, "Transparent, Conductive Graphene Electrodes for Dye-Sensitized Solar Cells," Nano Letters, 8 (2008) 323-327.
Li, D., Muller, M. C., Gilje, S., Kaner, R. B. & Wallace, G. Processable aqueous dispersions of graphene nanosheets. Nature Nanotechnology 3, 101-105 (2008).
Y. Si and E. T. Samulski, "Synthesis of Water Soluble Graphene," Nano Letters, 8 (6) (2008) 1679-1682.
Shioyama, H. Cleavage of graphite to graphene. J. Mater. Sci. Lett. 20, 499-500 (2001).
Viculis, L. M., Mack, J. J., & Kaner, R. B. A chemical route to carbon nanoscrolls. Science, 299, 1361 (2003).
Berger, C., et al. Ultrathin epitaxial graphite: 2-D electron gas properties and a route toward graphene-based nanoelectronics. J. Phys. Chem. B 108, 19912-19916 (2004).
Roy, H. V., Kallinger, C., Marsen, B. & Sattler, K. Manipulation of graphitic sheets using a tunneling microscope. J. Appl. Physics 83, (9) 4695-4699 (1998).
Geim, A. K. & Novoselov, K. S. The rise of grapheme. Nature Materials 6, 183-191 (2007).
Stankovich, S., et al. "Graphene-based composite materials," Nature Letters, 442, 282-286 (2006).
Sandip Niyogi, et al. Solution Properties of Graphite and Graphene, J. Am. Chem. Soc., 128 (24) (2006) 7720-7721.
Worsley, K. A "Soluble Graphene Derived from Graphite Fluoride," Chem. Phys. Lett ., 445 (1-3) (2007) 51-56.
Li, J., et al. Conductive graphite nanoplatelet/epoxy nanocomp.: effects of exfol. and UV/Ozone treatment of graphite. Scripta Materialia 53, 235-240 (2005).
Dikin, D. A. Preparation and characterization of graphene oxide paper. Nature Letters 448, 457-460 (2007).

\* cited by examiner

SUPERCRITICAL FLUID PROCESS FOR PRODUCING NANO GRAPHENE PLATELETS

FIELD OF THE INVENTION

The present invention relates generally to the field of carbon- or graphite-based nano materials, and more particularly to nano graphene platelets (NGPs).

BACKGROUND OF THE INVENTION

The present discussion of the prior art will make reference to the patent literature and technical papers listed at the end of this section.

The nanoscale graphene platelet (NGP) or graphene nanosheet is an emerging class of nano materials. An NGP is a nanoscale platelet composed of one or more layers of a graphene plane, with a platelet thickness from less than 0.34 nm to 100 nm. In a graphene plane, carbon atoms occupy a 2-D hexagonal lattice in which carbon atoms are bonded together through strong in-plane covalent bonds. In the c-axis or thickness direction, several graphene planes may be weakly bonded together through van der Waals forces to form a multi-layer NGP. An NGP may be viewed as a flattened sheet of a carbon nano-tube (CNT), with a single-layer NGP corresponding to a single-wall CNT and a multi-layer NGP corresponding to a multi-wall CNT.

For more than six decades, scientists have presumed that a single-layer graphene sheet (one atom thick) could not exist in its free state based on the reasoning that its planar structure would be thermodynamically unstable. Somewhat surprisingly, several groups worldwide have recently succeeded in obtaining isolated graphene sheets [Refs. 1-9]. NGPs are predicted to have a range of unusual physical, chemical, and mechanical properties. Several unique properties associated with these 2-D crystals have been discovered. In addition to single graphene sheets, double-layer or multiple-layer graphene sheets also exhibit unique and useful behaviors. In the present context, single-layer and multiple-layer graphene sheet structures are collectively referred to as NGPs. Graphene platelets may be oxidized to various extents during their preparation, resulting in graphite oxide (GO) platelets. Hence, although NGPs preferably or primarily refer to those containing no or low oxygen content, they can include GO nano platelets of various oxygen contents.

Although practical electronic device applications for graphene are not envisioned to occur within the next 5-10 years, its application as a nano filler in a composite material is imminent. However, the availability of processable graphene sheets in large quantities is essential to the success in exploiting composite and other applications for graphene. The present patent application addresses issues related to the production of processable or dispersible NGPs.

The processes for producing NGPs and NGP nanocomposites have been recently reviewed by the applicants, Jang and Zhamu [Ref. 9]. Basically, there are four different approaches that have been followed to produce NGPs. Their advantages and shortcomings are briefly summarized as follows:

Approach 1: Formation and Reduction of Graphite Oxide (GO) Platelets

The first approach entails treating a laminar graphite material (e.g., in most cases, natural graphite powder) with an intercalant and an oxidant (e.g., concentrated sulfuric acid and nitric acid, respectively) to obtain a graphite intercalation compound (GIC) or, actually, graphite oxide (GO). The obtained GIC or GO is then subjected to exfoliation using either a thermal shock exposure or a solution-based graphene layer separation approach.

Technically, the acid-treated graphite is actually oxidized graphite or graphite oxide (GO), rather than pristine graphite. In the thermal shock exposure approach, the GIC or GO is exposed to a high temperature (typically 800-1,050° C.) for a short period of time (typically 15 to 60 seconds) to exfoliate the treated graphite. Typically, the exfoliated graphite oxide is then subjected to a further sheet or flake separation treatment using air milling, mechanical shearing, or ultrasonication in a liquid (e.g., water).

In the solution-based graphene separation approach, the GO powder is dispersed in water or aqueous alcohol solution, which is subjected to ultrasonication. Alternatively, the GO powder dispersed in water is subjected to some kind of ion exchange or purification procedure in such a manner that the repulsive forces between ions residing in the inter-planar spaces overcome the inter-graphene van der Waals forces, resulting in graphene layer separations.

In both the heat- or solution-induced exfoliation approaches, the resulting products are GO platelets that must undergo a further chemical reduction treatment to reduce (but normally not eliminate) the oxygen content. Typically even after reduction, the electrical conductivity of GO platelets remains much lower than that of pristine graphene. Furthermore, the reduction procedure often involves the utilization of undesirable chemicals, such as hydrazine. In some cases of solution-based exfoliation, the separated and dried GO platelets were re-dispersed in water and then cast into thin GO films. These films were exposed to a high temperature, high vacuum environment for de-oxygenation, but the resulting GO platelets were no longer dispersible in water or other solvents.

Examples of Approach 1 are briefly discussed below:
  (a) Bunnell [10-12] developed a method in late 1988 that entailed intercalating graphite with a strong acid to obtain a GIC, thermally exfoliating the GIC to obtain discrete layers of graphite, and then subjecting the graphite layers to ultrasonic energy, mechanical shear forces, or freezing to separate the layers into discrete flakes. Although flakes as small as 10 nm were cited in the report [12], most of the flakes presented in the examples appeared to be thicker than 100 nm.
  (b) In a similar manner, Zaleski, et al. [13] used air milling to further delaminate thermally exfoliated graphite flakes. The resulting structures exhibited a specific surface area of 35 $m^2/g$, corresponding to an average flake thickness of approximately 25 nm.
  (c) Horiuchi, Hirata, and co-workers [14-16] prepared nano-scaled graphite oxide (GO) platelets, which they coined as carbon nano-films. These films were prepared by a two-step process—oxidation of graphite and purification of the resulting graphite oxide. The oxidation of graphite was conducted using the now well-known Hummer's method [17], which entailed immersing natural graphite particles in a mixture of $H_2SO_4$, $NaNO_3$, and $KMnO_4$ to obtain GICs that actually were GOs. By hydrolyzing the GIC, functional groups, such as acidic hydroxyl groups and ether groups, were introduced into the inter-graphene layer spaces. Each of the graphite oxide layers became a multiple-charge anion, having a thickness of approximately 0.6 nm. When the excess small ions derived from the oxidants (e.g., $NaNO_3$, and $KMnO_4$) were thoroughly removed by a purification process, many layers tended to automatically separate from each other due to interlayer electrostatic repulsion. The resulting GO layers formed a stable dispersion in water. According to Horiuchi, et al. [14], single-layer graphene was detected.

(d) It may be noted that the approach of using electrostatic repulsion to separate graphene oxide layers was pursued earlier in 1998 by Liu and Gong [18], as a first step in their attempt to synthesize polyaniline-intercalated GO. In a 3-D graphite crystal, the inter-layer spacing ($L_d$) is 0.335 nm, which is known to increase to 0.6-1.1 nm if graphite is oxidized to produce GO. Further, GO is hydrophilic and can be readily dispersed in aqueous solution.

(e) Dekany et al. [19] observed that the inter-graphene spacing in GO was increased to $L_d$=1.23 nm when GO particles were dispersed in 0.05 N NaOH solution. When dispersed in a 0.01 N NaOH solution, the spacing was essentially infinite, likely implying that GO was completely exfoliated to become a disordered structure.

(f) Chen et al. [20] exposed GO to a temperature of 1,050° C. for 15 seconds to obtain exfoliated graphite, which was then subjected to ultrasonic irradiation in a mixture solution of water and alcohol.

(g) Jang et al. [21] thermally expanded GIC or graphite oxide to produce exfoliated graphite and subjected exfoliated graphite to mechanical shearing treatments, such as ball milling, to obtain partially oxidized NGPs.

(h) Thermal exfoliation as a way of producing nano-structured graphite was also attempted by Petrik [22].

(i) Thermal exfoliation of intercalated graphite or graphite oxide was conducted by Drzal et al. [23] using microwaves as a heat source. Microwave energy induced graphite exfoliation was disclosed earlier by Kwon, et al. [24].

(j) Aksay, McAllister, and co-workers [7-9, 45] also used thermal exfoliation of GO to obtain exfoliated graphite oxide platelets, which were found to contain a high proportion of single-layer graphene oxide sheets, based on the BET method with nitrogen gas adsorption in the dry state and in an ethanol suspension with methylene blue dye as a probe.

(k) Several polar organic compounds and polymers have been intercalated into inter-graphene or inter-flake spaces to form intercalated or exfoliated GO nanocomposites [e.g., 25]. Partial reduction of a polymer-GO to a polymer-graphene nanocomposite also could be accomplished electrochemically or chemically [18,26].

(l) Preparation of ultra-thin films by a layer-by-layer self-assembly approach from GO nano platelets and polymer electrolytes also has been investigated [27-31]. Although the original intent of these studies was primarily to fabricate self-assembled GO-poly (ethylene oxide) nanocomposites, their first step almost always involved exfoliation and separation of GO platelets. This was evidenced by the X-ray diffraction data of the resulting structures that showed complete disappearance of those diffraction peaks corresponding to graphite oxide or pristine graphite [27,29].

(m) Stankovich et al. [32] followed the approaches of Hirata et al. [16] to produce and disperse graphite oxide sheets in water to obtain stable colloidal dispersions. The graphite oxide dispersion was then reduced with hydrazine, a procedure previously used by Liu and Gong earlier [18], but in the presence of poly (sodium 4-styrenesulfonate). This process led to the formation of a stable aqueous dispersion of polymer-coated graphene platelets. Stankovich et al. [33] further developed a method to produce less hydrophilic GO platelets using an isocyanate treatment. However, unless stabilized by selected polymers, the chemically modified graphene sheets obtained through these methods tend to precipitate as irreversible agglomerates due to their hydrophobic nature. The resulting agglomerates became insoluble in water and organic solvents.

(n) Li et al. [34] overcame this issue by using ammonium to adjust the pH value of a dispersion of chemically modified graphene sheets in water, which served to maximize the charge density on the resulting graphene sheets. The resulting electrostatic forces acted to stabilize the aqueous suspension.

(o) Si and Samulski [35] reported a chemical route to aqueous solutions of isolated graphene sheets by reducing graphene oxide in three steps. (1) pre-reduction of graphene oxide with sodium borohydride at 80° C. for 1 h to remove the majority of the oxygen functionality; (2) sulfonation with the aryl diazonium salt of sulfanilic acid in an ice bath for 2 h; and (3) post-reduction with hydrazine (100° C. for 24 h) to remove any remaining oxygen functionality. The lightly sulfonated graphene can be readily dispersed in water at reasonable concentrations (2 mg/mL) in the pH range of 3-10. Isolated graphene sheets persist in the mixture of water and organic solvents including methanol, acetone, acetonitrile, thus making it possible to further modify its surface for applications such as reinforcements in composites. This is a very tedious process, nevertheless.

(p) Another very tedious process for the preparation of GO nano sheets, proposed by Becerril, et al. [46], entailed (1) intercalating-oxidizing graphite with a solution of $NaNO_3$ and $KMnO_4$ in concentrated $H_2SO_4$ for 5 days; (2) washing the oxidized graphite with 5 wt. % $H_2SO_4$ in water and reacting the washed oxidized graphite with a 30 wt. % aqueous solution of $H_2O_2$ to complete the oxidation; (3) removing inorganic anions and other impurities through 15 washing cycles that included centrifugation, discarding supernatant liquid, and re-suspending the solid in an aqueous mixture of 3 wt. % $H_2SO_4$ and 0.5 wt. % $H_2O_2$ using stirring and ultrasonication; (4) carrying out another set of centrifugation and washing procedures three times using 3 wt % HCl in water as the dispersion medium and then one more time using purified water to re-suspend the solid; (5) passing this suspension through a weak basic ion-exchange resin to remove remaining acid; and (6) drying the suspension to obtain a powder.

Approach 2: Direct Formation of Pristine Nano Graphene Platelets (q) Without going through a chemical intercalation route, Mazurkiewicz [36] claimed to have produced graphite nano platelets having an average thickness in the range of 1-100 nm through high-pressure milling of natural flake graphite. However, no evidence was presented [36] to show that truly thin platelets (e.g., those <10 nm in thickness) were produced.

(r) Shioyama [37] prepared a potassium-intercalated GIC from highly oriented pyrolytic graphite (HOPG), initiated in situ polymerization of isoprene or styrene in the inter-graphene spaces, and then thermally decomposed inter-graphene polymer chains at a high temperature (500-1,000° C.). The volatile gas molecules served to exfoliate graphite layers, and, after the volatile gas escaped, isolated graphene sheets were obtained. Unfortunately, Shioyama did not discuss the thickness of the isolated graphene sheets.

(s) Jang, et al. [3,4] succeeded in isolating single-layer and multi-layer graphene structures from partially carbonized or graphitized polymeric carbons, which were obtained from a polymer or pitch precursor. Carbonization involves linking aromatic molecules or planar cyclic chains to form graphene domains or islands in an essentially amorphous carbon matrix. For instance, polymeric carbon fibers were obtained by carbonizing polyacrylonitrile (PAN) fibers to a desired extent that the fiber was composed of individual graphene sheets isolated or separated from each other by an amorphous carbon matrix. The resulting fibers were then subjected to a solvent extraction, or intercalation/exfoliation treatment. Graphene platelets were then extracted from these fibers using a ball milling procedure.

(t) Mack, Viculis, and co-workers [38,39] developed a low-temperature process that involved intercalating graphite with potassium melt and contacting the resulting K-intercalated graphite with alcohol, producing violently exfoliated graphite containing many ultra-thin NGPs. The process must be carefully conducted in a vacuum or an extremely dry glove box environment since pure alkali metals, such as potassium and sodium, are extremely sensitive to moisture and pose an explosion danger. It is questionable if this process is easily amenable to the mass production of nano-scaled platelets. One major advantage of this process is the notion that it produces non-oxidized graphene sheets since no acid/oxidizer intercalation or a high temperature is involved.

(u) In 2004, Novoselov, Geim, and co-workers [1,2] prepared single-sheet graphene by removing graphene from a graphite sample one sheet at a time using a "Scotch-tape" method. Although this method is not amenable to large-scale production of NGPs, their work did spur globally increasing interest in nano graphene materials, mostly motivated by the thoughts that graphene could be useful for developing novel electronic devices.

(v) Zhamu and Jang [54] developed a very effective way of exfoliating/separating NGPs from natural graphite and other laminar graphitic materials by exposing the material (without any intercalation or oxidation) to an ultrasonication treatment. This process may be considered as peeling off graphene layers at a rate of 20,000 layers per second (if the ultrasonic frequency is 20 kHz) or higher (if higher frequency). The resulting NGPs are pristine graphene without any intentionally added or bonded oxygen.

Approach 3: Epitaxial Growth and Chemical Vapor Deposition of Nano Graphene Sheets on Inorganic Crystal Surfaces (w) Small-scale production of ultra-thin graphene sheets on a substrate can be obtained by thermal decomposition-based epitaxial growth [40] and a laser desorption-ionization technique [41]. A scanning probe microscope was used by Roy et al. [42] and by Lu et al. [43] to manipulate graphene layers at the step edges of graphite and etched HOPG, respectively, with the goal of fabricating ultra-thin nano-structures. It was not clear if single graphene sheets were obtained using this technique by either group. Epitaxial films of graphite with only one or a few atomic layers are of technological and scientific significance due to their peculiar characteristics and great potential as a device substrate. The graphene sheets produced are meant to be used for future nano-electronic applications, rather than composite reinforcements.

Approach 4: The Bottom-Up Approach (Synthesis of Graphene from Small Molecules)

(x) X. Yang, et al. [44] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

There are several major issues associated with the aforementioned processes. These include, for instance:

(1) In most of these methods of graphite intercalation and exfoliation, undesirable chemicals are used. Consequently, a tedious washing step is required, which produces contaminated waste water that requires costly disposal steps.

(2) The GO nano platelets prepared by Approach 1 exhibit an electrical conductivity typically several orders of magnitude lower than the conductivity of pristine NGPs. Even after chemical reduction, the GO still exhibits a much lower conductivity than pristine NGPs. It appears that the preparation of intercalated graphite, which involves the use of an oxidizing agent such as nitric acid or potassium permanganate, typically and necessarily requires graphite to be heavily oxidized. Complete reduction of these highly oxidized graphite platelets to recover the perfect graphene structure hitherto has not been successfully attained.

(3) The NGPs produced by Approach 2 and Approach 3 are normally pristine graphene and highly conducting. However, other than the direct ultrasonication method developed by the applicants earlier [54], these processes are not amenable to large-scale production of NGPs with a reasonable cost.

In an attempt to address these issues, the applicants have previously disclosed a process for exfoliating a layered material to produce nano-scaled platelets having a thickness smaller than 100 nm [Ref. 57]. The process comprises: (a) charging a layered material to an intercalation chamber comprising a gaseous environment at a first temperature and a first pressure sufficient to cause gas species to penetrate into an interstitial space between layers of the layered material, forming a gas-intercalated layered material; and (b) operating a discharge means to rapidly eject the gas-intercalated layered material through a nozzle into an exfoliation zone at a second pressure and a second temperature, allowing gas species residing in the interstitial space to exfoliate the layered material for producing the platelets. One advantage of this process is the notion that it does not involve the utilization of undesirable acids (such as sulfuric acid or nitric acid) or oxidizers (such as sodium chlorate or potassium permanganate). The gas environment used in the process can include a supercritical fluid, but the intercalated layered material must be rapidly discharged out of the intercalation chamber.

In a related topic, Kaschak, et al. [55] proposed a method of modifying graphite by introducing a supercritical fluid into interstices of chemically intercalated or intercalated/oxidized graphite (rather than the original natural graphite). The interstices of intercalated and/or oxidized graphite had been expanded and chemically modified due to the presence of intercalant species (such as sulfuric acid) or oxidation-induced functional groups (such as carboxyl). Kaschak, et al. [55] did not teach about the approach of directly intercalating the un-treated natural flake graphite with a supercritical fluid; nor did they teach about the approach of intercalating and exfoliating graphite using the same supercritical fluid. The modified graphite as proposed by Kaschak, et al. [55] still required a high temperature exposure step, typically at 700-1,200° C., to exfoliate the intercalated and modified graphite.

Furthermore, Kaschak, et al. [55] did not provide any evidence to show the existence of nano-scaled graphite particles that they claimed they produced with this method. In particular, they claimed that "one advantage of the invention is that the aforementioned methods may be used to manufacture graphite in a form that has a thickness of less than about 10 microns, preferably less than about 1 micron, more preferably less than about 100 nm, even more preferably less than about 10 nm, and most preferably less than about 1 nm." However, they did not fairly suggest the conditions under which graphite particles with a thickness less than 10 nm or 1 nm could be produced. This was truly a big claim and should have been supported by solid experimental evidence; unfortunately, absolutely no evidence whatsoever was presented.

Gulari, et al. [56] proposed a method of delaminating a graphite structure with a coating agent solubilized in a supercritical fluid. According to Gulari, et al. [56], the coating agent was a polymer, monomer, or oil. The method comprises diffusing a coating agent in a supercritical fluid between layered particles of a graphite structure and catastrophically depressurizing the supercritical fluid to delaminate the coating agent-intercalated graphite particles. However, Gultari, et al. [56] failed to mention anything about the thickness of the delaminated particles. It was not clear if and how graphite platelets with a thickness less than 100 nm could be produced with this method. Gulari, et al. presumed that a coating agent was needed to prevent the reformation of the covalent bonds between graphite particles when they were broken during delamination. This is rather confusing or misleading since it is well-known that the bonding between graphite layers is van der Waals force rather than covalent bond. Furthermore, a coating agent is problematic if a pure graphene product is desired. Gulari, et al. [56] did not teach if a supercritical fluid without a coating agent solubilized therein would be capable of delaminating graphite layers. Neither Kaschak, et al. [55] nor Gulari, et al. [56] discuss the properties of the resulting exfoliated graphite.

By contrast, after an intensive research and development effort, we have found that a supercritical fluid, alone without a coating agent, was capable of both intercalating and exfoliating a graphitic material without involving an additional intercalation or oxidation step (as required in Kaschak, et al. [55]). Further, this supercritical fluid-based process is capable of producing nano graphene platelets that are ultra-thin (<10 nm) and, in many cases, thinner than 1 nm. We have also discovered that it was not necessary to discharge the supercritical fluid-intercalated graphite out of a pressure chamber to achieve graphite exfoliation. Instead, exfoliation of graphite for the NGP production could be carried out by rapidly de-pressurizing or releasing the gas from the chamber where a graphitic material was tentatively intercalated by a supercritical fluid. By keeping the exfoliated graphite or NGPs in the chamber, the chamber can be re-pressurized and then de-pressurized to further separate multi-layer NGPs. This procedure can be repeated until all or most of the NGPs are single-layered structures.

Hence, it was an object of the present invention to provide a pristine nano graphene platelet material that has good electrical conductivity.

It was another object of the present invention to provide a process for mass-producing pristine NGPs without involving the use of any undesirable chemical.

It was a further object of the present invention to provide a process for producing ultra-thin NGPs (e.g., those with a thickness less than 1 nm).

References Cited

1. Novoselov, K. S., et al. Electric field effect in atomically thin carbon films. *Science* 306, 666-669 (2004).
2. Novoselov, K. S., et al. Two dimensional atomic crystals. *Proc. Natl. Acad. Sci.* 102, 10451-10453 (2005).
3. Jang, B. Z. & Huang, W. C. Nano-scaled grapheme plates. U.S. Pat. No. 7,071,258, (submitted on Oct. 21, 2002 and issued on Jul. 4, 2006).
4. Jang, B. Z. Process for nano-scaled graphene plates. U.S. patent application Ser. No. 11/442,903 (Jun. 20, 2006); a divisional of Ser. No. 10/274,473 (Oct. 21, 2002).
5. McAllister, M. J., et al. Single sheet flinctionalized graphene by oxidation and thermal expansion of graphite. *Chem. Materials* 19(18), 4396-4404 (2007).
6. Li, J. L., et al. Oxygen-driven unzipping of graphitic materials. *Phys. Rev. Lett.* 96, 176101-1-4 (2006).
7. Schniepp, H. C., et al. Functionalized single graphene sheets derived from splitting graphite oxide. *J. Phys. Chem. B*110, 8535-8547 (2006).
8. Li, X., Wang, X., Zhang, L., Lee, S. & Dai, H., Chemically derived, ultrasmooth graphene nanoribbon semiconductor. *Science* 319, 1229-1232 (2008).
9. Bor Z. Jang and A Zhamu, "Processing of Nano Graphene Platelets (NGPs) and NGP Nanocomposites: A Review," J. Materials Sci. 43 (2008) 5092-5101.
10. Bunnell, Sr. L. R. Enhancement of the mechanical properties by graphite flake addition. U.S. Pat. No. 4,987,175 (Jan. 22, 1991).
11. Bunnell, Sr. L. R. Enhancement of mechanical properties of polymers by thin flake addition and apparatus for producing such thin flakes. U.S. Pat. No. 5,019,446 (May 28, 1991).
12. Bunnell, Sr. L. R. Method for producing thin graphite flakes with large aspect ratios. U.S. Pat. No. 5,186,919 (Feb. 16, 1993).
13. Zaleski, P. L., et al. Method for expanding lamellar forms of graphite and resultant product. U.S. Pat. No. 6,287,694 (Sep. 11, 2001).
14. Horiuchi, S., et al. Single graphene sheet detected in a carbon nanofilm. *Appl. Phys. Lett.* 84, 2403-2405 (2004); paper received on 8 Sep. 2003.
15. Hirata, M. & Horiuchi, S. Thin-film-like particles having skeleton constructed by carbons and isolated films," U.S. Pat. No. 6,596,396 (Jul. 22, 2003).
16. Hirata, M. & Horiuchi, S. Composites containing thin-film particles having carbon skeleton, method of reducing the thin-film particles, and process for the production of the composite. U.S. Pat. No. 6,828,015 (Dec. 7, 2004).
17. Hummers, W. S. Preparation of graphitic acid. U.S. Pat. No. 2,798,878, Jul. 9, 1957.
18. Liu, P. & Gong, K. Synthesis of polyaniline-intercalated graphite oxide by an in situ oxidative polymerization reaction. *Carbon* 37, 706-707 (1999).
19. Dekany, I., Kruger-Grasser, R. & Weiaa, A. Selective liquid sorption properties of hydrophobized graphite oxide nanostructures. *Colloid Polymer Sci.* 276, 570-576 (1998).
20. Chen, G. H. Preparation and characterization of graphite nanosheets from ultrasonic powdering technique. *Carbon* 42, 753-759 (2004).
21. Jang, B. Z., Wong, S. C. & Bai, Y. Process for producing nano-scaled graphene plates," U.S. patent application Ser. No. 10/858,814 (Jun. 3, 2004); Pub. No. US 2005/0271574 (Pub. Dec. 8, 2005).
22. Petrik, V. I. Mass production of carbon nanostructures. U.S. patent application Ser. No. 11/007,614 (Dec. 7, 2004); Publ No. US 2006/0121279 (Pub. Jun. 8, 2006).
23. Drzal L. T. & Fukushima, H. Expanded graphite and products produced therefrom. U.S. patent application Ser. No. 11/363,336 (Feb. 27, 2006); Ser. No. 11/361,255 (Feb. 24, 2006); Ser. No. 10/659,577 (Sep. 10, 2003).

24. Y. B. Kwon, et al., "Method for Producing Expanded Graphite," U.S. Pat. No. 6,306,264 (Oct. 23, 2001).
25. Matsuo, Y., Tahara, K. & Sugie, Y. Preparation and characterization of poly(vinyl alcohol)- and $Cu(OH)_2$-poly(vinyl alcohol)-intercalated graphite oxides. *Chem. Materials* 10, 2266-2269 (1998).
26. Du, X. S., Xiao, M., Meng, Y. Z. & Hay, A. S. Direct synthesis of poly(arylene disulfide)/carbon nano-sheet composites via the oxidation with graphite oxide. *Carbon* 43, 195-213 (2005).
27. Matsuo, Y., Tahara, K. & Sugie, Y. Synthesis of poly (ethylene oxide)-intercalated graphite oxide. *Carbon* 34, 672-674 (1996).
28. Kotov, N. A., Dekany, I. & Fendler, J. H. Ultrathin graphite oxide-polyelectrolyte composites prepared by self-assembly: transition between conductive and non-conductive states. *Adv. Mater.* 8, 637-641 (1996).
29. Matsuo, Y., Tahara, K. & Sugie, Y. Structure and thermal properties of poly(ethylene oxide)-intercalated graphite oxide. *Carbon* 35 *(1)*, 113-120 (1997).
30. Kovtyukhova, N. I. et al. Layer-by-layer assembly of ultrathin composite films from micron-sized graphite oxide sheets and polycations. *Chem. Mater.* 11, 771-778 (1999).
31. Szabo, T., Szeri, A. & Dekany, I. Composite graphitic nanolayers prepared by self-assembly between finely dispersed graphite oxide and a cationic polymer. *Carbon* 43, 87-94 (2005).
32. Stankovich, S. Stable aqueous dispersions of graphitic nanoplatelets via the reduction of exfoliated graphite oxide in the presence of poly(sodium 4-styrenesulfonate). *J. Mater. Chem.* 16, 155-158 (2006).
33. Stankovich, S., Piner, R. D., Nguyen, S. T. and Ruoff, R. S. Synthesis and exfoliation of isocyanate-treated graphene oxide nanoplatelets. *Carbon* 44, 3342-3347 (2006).
34. Li, D., Muller, M. C., Gilje, S., Kaner, R. B. & Wallace, G. Processable aqueous dispersions of graphene nanosheets. *Nature Nanotechnology* 3, 101-105 (2008).
35. Y. Si and E. T. Samulski, "Synthesis of Water Soluble Graphene," Nano Letters, 8 (6) (2008) 1679-1682.
36. Mazurkiewicz, M. Graphite platelet nanostructures. U.S. patent application Ser. No. 09/951,532,; Pub. No. US 2002/0054995 (Published on May 9, 2002).
37. Shioyama, H. Cleavage of graphite to graphene. *J. Mater. Sci. Lett.* 20, 499-500 (2001).
38. Mack, J. J. et al. Chemical manufacture of nanostructured materials. U.S. Pat. No. 6,872,330 (Mar. 29, 2005).
39. Viculis, L. M., Mack, J. J., & Kaner, R. B. A chemical route to carbon nanoscrolls. *Science*, 299, 1361 (2003).
40. Berger, C., et al. Ultrathin epitaxial graphite: two-dimensional electron gas properties and a route toward graphene-based nanoelectronics. *J. Phys. Chem. B* 108, 19912-19916 (2004).
41. Udy, J. D. Method of continuous, monoatomic thick structures. U.S. patent application Ser. No. 11/243,285 (Oct. 4, 2005); Pub No. 2006/0269740 (Nov. 30, 2006).
42. Roy, H. V., Kallinger, C., Marsen, B. & Sattler, K. Manipulation of graphitic sheets using a tunneling microscope. *J. Appl. Physics* 83, (9) 4695-4699 (1998).
43. Lu, X. K., Yu, M. F., Huang, H., & Ruoff, R. S. Tailoring graphite with the goal of achieving single sheets. *Nanotechnology* 10, 269-272 (1999).
44. X. Yang, X. Dou, A. Rouhanipour, L. Zhi, H. J. Raider, and K. Mullen, "Tow-dimensional Graphene Nano-ribbons," J. Am. Chem. Soc. 130 (2008) 4216-17.
45. Prud'Homme, R. K., Aksay, I. A., Adamson, D. & Abdala, A. Thermally exfoliated graphite oxide. U.S. patent application Ser. No. 11/249,404 (Oct. 14, 2005); Pub No. US 2007/0092432 (Apr. 26, 2007).
46. H. A. Becerril, J. Mao, Z. Liu, R. M. Stoltenberg, Z. Bao, and Y. Chen, "Evaluation of Solution-Processed Reduced Graphene Oxide Films as Transparent Conductors," ACS Nano, 2 (2008) 463-470.
47. X. Wang, L. Zhi, and K. Muellen, "Transparent, Conductive Graphene Electrodes for Dye-Sensitized Solar Cells," Nano Letters, 8 (2008) 323-327.
48. Stankovich, S., et al. "Graphene-based composite materials," *Nature Letters*, 442, 282-286 (2006).
49. Sandip Niyogi, Elena Bekyarova, Mikhail E. Itkis, Jared L. McWilliams, Mark A. Hamon, and Robert C. Haddon, "Solution Properties of Graphite and Graphene, *J. Am. Chem. Soc.*, 128 (24) (2006) 7720-7721.
50. Worsley, K. A.; Ramesh, P.; Mandal, S. K.; Niyogi, S.; Itkis, M. E.; Haddon, R. C. "Soluble Graphene Derived from Graphite Fluoride," *Chem. Phys. Lett.*, 445 (1-3) (2007) 51-56.
51. Li, J., Kim, J. K. & Sham, M. L. Conductive graphite nanoplatelet/epoxy nanocomposites: effects of exfoliation and UV/Ozone treatment of graphite. *Scripta Materialia* 53, 235-240 (2005).
52. Dikin, D. A. Preparation and characterization of graphene oxide paper. *Nature Letters* 448, 457-460 (2007).
53. Geim, A. K. & Novoselov, K. S. The rise of grapheme. *Nature Materials* 6, 183-191 (2007).
54. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent Pending, Ser. No. 11/800,728 (May 8, 2007).
55. D. M. Kaschak, et al., "Graphite Intercalation and Exfoliation Process," U.S. Pat. No. 7,105,108 (Sep. 12, 2006).
56. E. Gulari, et al., "Method of Delaminating a Graphite Structure with a Coating Agent in a Supercritical Fluid," U.S. Pat. No. 7,157,517 (Jan. 2, 2007).
57. Bor Z. Jang, Aruna Zhamu, and Jiusheng Guo, "Mass Production of Nano-scaled Platelets and Products," U.S. patent Pending, Ser. No. 11/526,489 (Sep. 26, 2006).

SUMMARY OF THE INVENTION

The present invention provides a process for producing a nano graphene platelet (NGP) material. The process comprises: (i) subjecting a graphitic material to a supercritical fluid at a first temperature and a first pressure for a first period of time in a pressure vessel and then (ii) rapidly depressurizing the fluid (preferably by discharging part of the fluid out of the vessel) at a fluid release rate sufficient for effecting exfoliation of the graphitic material to obtain the desired NGP material.

A preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden depressurization to exfoliate individual graphene layers. Other suitable supercritical fluids include methane, ethane, ethylene, hydrogen peroxide ($H_2O_2$), ozone, water oxidation (water containing a high concentration of dissolved oxygen), sulfonic group ($SO_3$), or a mixture thereof. If desirable, a supercritical fluid can comprise therein a surfactant (or dispersing agent), a coating agent (e.g., a monomer, curing agent, or resin), and/or a reactive species (e.g., ozone, oxygen, acid vapor, $SO_3$, etc).

The graphitic material is not limited to natural graphite; it may be selected from the group consisting of natural graphite, artificial graphite, graphite oxide, graphite fluoride, graphite fiber, carbon fiber, carbon nano-fiber, carbon nano-tube, mesophase carbon micro-bead (MCMB), soft carbon, hard carbon, and combinations thereof. Technically, MCMBs or CMS are usually obtained from a petroleum heavy oil or pitch, coal tar pitch, or polynuclear hydrocarbon material (highly aromatic molecules). When such a precursor pitch material is carbonized by heat treatment at 400° to 550° C., micro-crystals called mesophase micro-spheres are formed in a non-crystalline pitch matrix. These mesophase microspheres, after being isolated from the pitch matrix (which is typically soluble in selected solvents), are often referred to as meso-carbon micro-beads (MCMB). The MCMBs commercially available are those that have been subjected to a further heat treatment at a temperature in the range of 2,000° C. and 3,000° C.

The process may further comprise a procedure that involves essentially repeating the cycle consisting of step (i) and step (ii). In essence, this procedure includes (a) subjecting the NGP material to a supercritical fluid at a second temperature and a second pressure for a second period of time in a pressure vessel and then (b) rapidly de-pressurizing the fluid at a fluid release rate sufficient for effecting further exfoliation of the NGP material. The second temperature may be different from or the same as the first temperature. The second pressure may be different from or the same as the first pressure.

In another preferred embodiment, the supercritical fluid contains a surfactant or dispersing agent dissolved therein. A surfactant may be capable of rapidly covering the new surfaces created during the delamination or separation between two graphene layers, thereby preventing the re-formation of inter-graphene van der Waals forces (re-joining of two graphene sheets). This speculation was consistent with our surprising observation that the presence of a surfactant tends to result in much thinner NGPs as compared with the surfactant-free case under comparable processing conditions.

Again, the procedure can be repeated to further reduce the thickness of NGPs. The repeated cycle can include (a) subjecting the NGP material to a supercritical fluid (containing a surfactant dissolved therein) at a second temperature and a second pressure for a second period of time in a pressure vessel and then (b) rapidly de-pressurizing the fluid at a fluid release rate sufficient for effecting further exfoliation of the NGP material. Again, the second temperature may be different from or the same as the first temperature and the second pressure may be different from or the same as the first pressure.

In yet another preferred embodiment of the present invention, the supercritical fluid contains a coating agent dissolved therein and the process further comprises a procedure of repeating the supercritical fluid intercalation and exfoliation steps. These steps include (a) subjecting the NGP material to a supercritical fluid (containing a coating agent dissolved therein) at a second temperature and a second pressure for a second period of time in a pressure vessel and then (b) rapidly de-pressurizing the fluid at a fluid release rate sufficient for effecting further exfoliation of the NGP material. The coating agent may comprise a monomer, a prepolymer or oligomer, a polymer, a resin, a curing agent, or a combination thereof. This process is particularly useful for the production of thin NGP-reinforced polymer composites. For the preparation of a thermoset resin composite, it is advantageous to have a supercritical fluid containing a curing agent dissolved therein. The curing agent, typically a low molecular weight species, can penetrate into the inter-graphene spaces (also referred to as interstitial spaces), along with the supercritical fluid. Upon-depressurization, the curing agent will precipitate out to cover the newly formed graphene surfaces. In addition to possibly serving to prevent the re-joining of graphene layers, the curing agent also acts to change the graphene surface properties, promoting the subsequent wetting of the graphene surface by a thermosetting resin (e.g., epoxide). Hence, the process further comprises mixing the curing agent-covered graphene material with a thermosetting resin.

In many cases, the NGPs produced in our studies have a specific surface area in the range of approximately 300 $m^2/g$ to 2,600 $m^2/g$. The NGPs obtained with the presently invented process tend to contain a significant proportion of single-layer graphene (with a thickness of 0.34-0.4 nm) or graphene of few layers (<2 nm).

The NGP material obtained with this process, when formed into a thin film with a thickness no greater than 100 nm, exhibits an electrical conductivity of typically at least 100 S/cm and quite often higher than 1,000 S/cm.

The presently invented process is superior to many prior art processes (e.g., those belonging to the aforementioned Approach 1 and Approach 2) in several aspects:

(1) For instance, as discussed earlier, Aksay, McAllister, and co-workers [Refs. 7-9, 45] used thermal exfoliation of completely oxidized graphite (GO) to obtain exfoliated graphite oxide platelets. The process involved exposing the GO to a gas environment at 1,050° C. for 30 seconds or in a propane torch for less than 15 seconds. Such a thermal shock exposure typically produces graphite oxide platelets (rather than nano graphene) that are typically not electrically conducting.

(2) In another commonly used prior art approach, as practiced by Stankovich et al. [32] and Hirata et al. [16], graphite was heavily oxidized to obtain graphite oxide, which was then mixed with water. The resulting suspension was then subjected to ultrasonication for an extended period of time to produce colloidal dispersions of GO platelets. The graphite oxide dispersion was then reduced with hydrazine, in the presence of poly (sodium 4-styrenesulfonate). This process led to the formation of a stable aqueous dispersion of polymer-coated graphene platelets. In some applications, a polymer coating may be undesirable (pure graphene being preferred). Furthermore, the reducing agent, hydrazine, is a toxic substance.

(3) Becerril, et al [46] and Wang, et al. [47] independently developed a very similar process for producing transparent, yet conducting electrode. The electrode was made by following a very tedious process that involves oxidation of natural graphite to form GO, repeated washing, ultrasonication, and 15 cycles of impurity removal steps that include centrifugation, discarding supernatant liquid, and re-suspending the solid in an aqueous mixture of sulfuric acid and hydrogen peroxide [46]. The suspension was eventually spin-coated on a solid substrate to form a GO thin film, which was then partially reduced by heating the film in a high vacuum at a high temperature for a long period of time. Such a long process does not appear to be amenable to mass production of conducting nano graphene platelets.

(4) Another unexpected benefit of the presently invented process is the observation that the pristine NGPs produced are relatively defect-free, exhibiting an exceptionally high conductivity. In contrast, the heavily oxidized GO platelets are typically highly defected and could not fully recover the perfect graphene structure even after chemical reduction. Therefore, the resulting platelets exhibit a conductivity lower than that of a more perfect NGP obtained with the presently invented process.

(5) The presently invented process, if desirable, allows for a wide range of chemical species to mix with a supercritical fluid so that desirable species may come in contact with the resulting NGPs. For instance, a reactive species (e.g., ozone, oxygen, acid vapor, $SO_3$, etc) may be mixed with or dissolved in carbon dioxide for the purpose of imparting a desirable functional group to NGPs while being formed or immediately after their formation.

BRIEF DESCRIPTION OF THE DRAWINGS

FIG. 2 (A) An MCMB sample after the first cycle of supercritical fluid intercalation and exfoliation; and (B) A TEM image of the resulting NGPs after a repeated cycle.

FIG. 3 (A) A graphite fiber sample after first cycle of supercritical fluid intercalation and exfoliation (original graphite fibers of substantially spherical cross-section with a diameter of 12 μm have been split into many thinner, elongate, flake-like fibrils); and (B) The resulting NGPs after a repeated cycle exhibit a large length-to-width ratio, in addition to having a ultra-high length-to-thickness ratio (e.g., 1,000 nm/0.34 nm=3,000).

DETAILED DESCRIPTION OF PREFERRED EMBODIMENTS

A preferred embodiment of the present invention is a process that involves intercalating and exfoliating a graphitic material with a supercritical fluid to obtain NGPs. Optionally, a supercritical fluid can comprise therein a surfactant (or dispersing agent), a coating agent (e.g., a monomer, curing agent, or resin), and/or a reactive species (e.g., ozone, oxygen, acid vapor, $SO_3$, etc).

If a substance is heated above a critical temperature (Tc) and pressurized above a critical pressure (Pc), it becomes a supercritical fluid. Supercritical fluids are known to provide convenient means to achieve solvating properties, which have both gas and liquid characteristics without actually changing the chemical structure of a substance. With a proper control of pressure and temperature, several physicochemical properties (e.g., density, diffusivity, dielectric constant, viscosity, and surface free energy) of this substance can be varied to a significant extent. In particular, under supercritical fluid conditions, a fluid can readily diffuse into the internal structure of a solid material; e.g., inter-graphene spaces in a graphitic material.

As an example, carbon dioxide may exist as a supercritical fluid having properties of both a liquid and a gas when above its critical temperature (>31° C.) and critical pressure (>7.4 MPa). Under supercritical conditions, $CO_2$ exhibits both a gaseous property, being able to penetrate through many materials and a liquid property, being able to dissolve many materials. Although $CO_2$ is a preferred medium, the supercritical fluid may be selected from other suitable species, such as water, hydrogen peroxide, ozone, water oxidation, methane, ethane, ethylene, or a mixture thereof. The supercritical point of water comprises a temperature of at least about 374° C. and a pressure of at least about 22.1 MPa. At or about the supercritical point, the density and viscosity of water decreases and the diffusivity of water molecules and the mobility of other chemical species dissolved in the water increase.

Hence, as a preferred embodiment, the presently invented process comprises: (i) exposing a graphitic material to a supercritical fluid at a first temperature and a first pressure for a first period of time in a pressure vessel and then (ii) rapidly depressurizing the fluid by discharging part of the fluid out of the vessel at a fluid release rate sufficient for effecting exfoliation of the graphitic material to obtain the desired NGP material. Presumably, the supercritical fluid in the pressure vessel penetrates into the spaces between graphene layers to form a tentatively intercalated graphite compound. With rapid depressurization, the fluid in the interstitial spaces quickly expands to push apart neighboring graphene layers, a process called delamination or exfoliation. This exfoliation step produces NGPs that are typically thinner than 10 nm in thickness.

As a first step, the starting material (e.g., natural flake graphite particles, MCMBs, or carbon fibers) is placed inside a high pressure vessel. The vessel is then sealed off from the atmosphere. This is followed by introducing high-pressure $CO_2$ into the vessel with $CO_2$ being pressurized to preferably above approximately 1,070 to 10,000 psig (7.4 MPa to 69 MPa). Then, the vessel is heated to a temperature preferably above about 40° C., and more preferably above 70° C. These conditions define a supercritical condition of $CO_2$ whereby the $CO_2$ is capable of penetrating into inter-graphene spaces. Pressurizing and heating the graphitic particles with the supercritical fluid may be accomplished by any conventional means. For instance, the vessel may be heated by a heating jacket or electrical heating tape wrapped around the vessel.

If a chemical species, such as reactive ozone molecules, is desired, it can be introduced into the pressure vessel before, during, or after the intended supercritical fluid is introduced. If the species is in a liquid state (e.g., a surfactant or a curing agent for a resin) or solid state (e.g., a resin), it is preferably placed into the vessel (e.g., mixed with the starting graphitic material) prior to sealing off the vessel.

The procedure further comprises catastrophically depressurizing the tentatively intercalated graphite by releasing the fluid out of the vessel at a high rate. During catastrophic depressurization, the supercritical fluid rapidly expands to exfoliate the graphite layers. The depressurization step comprises immediately depressurizing the vessel down to a considerably lower pressure, preferably ambient pressure. This may be accomplished in a time period of between about 5 and 30 seconds, and preferably 15 seconds. Specifically, this may be accomplished by depressurizing the pressure vessel at a rate of between about 0.1 and 5.0 milliliters per second, and preferably 3.0 milliliters per second. The pressure decrease may be accomplished by opening a vessel valve to the atmosphere. As immediate depressurization occurs, the graphite layers are delaminated apart from one another.

The process may further comprise a procedure that involves essentially repeating the pressurization/heating step and the depressurization step for at least another cycle. The repeating cycle includes (a) subjecting the NGP material to a supercritical fluid at a second temperature and a second pressure for a second period of time in a pressure vessel (preferably the same vessel) and then (b) rapidly de-pressurizing the fluid at a fluid release rate sufficient for effecting further exfoliation of the NGP material. The second temperature may be different from or the same as the first temperature and the second pressure may be different from or the same as the first pressure. It was observed that a higher pressure for a given pressurization time tended to result in a more effective exfoliation, as evidenced by a reduced average NGP thickness.

In another preferred embodiment, the supercritical fluid contains a surfactant or dispersing agent dissolved therein. Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexameta-phosphate, sodium lignosulphonate (e.g., marketed under the trade names Vanisperse CB and Marasperse CBOS-4 from Borregaard LignoTech), sodium sulfate, sodium phosphate, and sodium sulfonate. Presumably, a surfactant is capable of rapidly covering the new surfaces created during the delamination or separation between two graphene layers, thereby preventing the re-formation of inter-graphene van der Waals forces (re-joining of two graphene sheets). This speculation was consistent with our surprising observation that the presence of a surfactant tends to result in much thinner NGPs as compared with the surfactant-free case under comparable processing conditions. It is of significance to note that the surfactant is normally easy to remove after the formation of NGPs; e.g., via heat-induced vaporization or simple water rinsing.

Again, the procedure of supercritical fluid intercalation (pressurizing and heating) and exfoliation (depressurization) can be repeated for at least another cycle to further reduce the thickness of NGPs. The cycle can include (a) subjecting the NGP material to a supercritical fluid (containing a surfactant dissolved therein) at a second temperature and a second pressure for a second period of time in a pressure vessel and then (b) rapidly depressurizing the fluid at a fluid release rate sufficient for effecting further exfoliation of the NGP material. Again, the second temperature may be different from or the same as the first temperature and the second pressure may be different from or the same as the first pressure.

In yet another preferred embodiment of the present invention, the supercritical fluid contains a coating agent dissolved therein. The process comprises supercritical fluid intercalation (at a first temperature and first pressure) and exfoliation of a graphitic material to produce NGPs and then repeating the supercritical fluid intercalation and exfoliation steps for the resulting NGPs. These repeating steps include (a) subjecting the NGP material to a supercritical fluid (containing a coating agent dissolved therein) at a second temperature and a second pressure for a second period of time in a pressure vessel and then (b) rapidly de-pressurizing the fluid at a fluid release rate sufficient for effecting further exfoliation of the NGP material.

The coating agent may comprise a monomer, a prepolymer or oligomer, a polymer, a resin, a curing agent, or a combination thereof. This process is particularly useful for the production of thin NGP-reinforced polymer composites. For the preparation of a thermoset resin composite, it is advantageous to have a supercritical fluid containing a curing agent dissolved therein. The curing agent, typically a low molecular weight species, can penetrate into the inter-graphene spaces (also referred to as interstitial spaces), along with the supercritical fluid. Upon-depressurization, the curing agent will precipitate out to cover the newly formed graphene surfaces. In addition to possibly serving to prevent the re-joining of graphene layers, the curing agent also acts to change the graphene surface properties, promoting the subsequent wetting of the graphene surface by a thermosetting resin (e.g., epoxide). Hence, the process further comprises mixing the curing agent-covered graphene material with a thermosetting resin.

As suggested by Gulari, et al. [56], one may choose to use a coating agent that can be solubilized in the supercritical fluid to diffuse between the graphite layers. The purpose of this coating agent, according to Gulari, et al. [56], was to allow the coating agent to expand or swell the interstitial spaces between graphene layers (to assist in intercalation and exfoliation) and, after depressurization, the coating agent will precipitate out to surround and isolate the exfoliated graphene platelets. This coating agent (e.g., a polymer) will eventually become a part (the matrix) of a composite material. Generally, the coating agent may include a polymer, oligomer, prepolymer, or a monomer. In one embodiment, the coating agent is poly-(dimethyl siloxane) ("PDMS") having a weight average molecular weight of preferably between about 30,000 and 200,000 g/mole. Other suitable coating agents include poly-(tetrafluoroethylene-co-hexafluoropropylene), poly-(perfluoro-propylene oxide), poly-(diethyl-siloxane), poly-(dimethylsilicone), poly-(phenylmethylsilicone), perfluoroalkylpolyethers, chloro-trifluoro-ethylene, and bromotrifluoroethylene.

It may be noted that Gulari, et al. [56] did not teach about repeating the intercalation and exfoliation procedure for the purpose of further reducing the NGP thickness.

The graphitic material particles and the coating agent may be disposed in a high pressure vessel that is isolatable from the atmosphere. In this embodiment, the graphite particles comprise about 23 to 83 weight percent and the coating agent comprises about 77 to 17 weight percent of material placed in the vessel. The weight ratio of graphite particles to the coating agent is preferably at least about 1:10. Then, the pressure vessel is sealed off from the atmosphere. This is followed by introducing high-pressure carbon dioxide into the compartment with $CO_2$ being pressurized in the vessel to preferably above approximately 1,070 psig (7.4 MPa). Then, the vessel is heated to a temperature preferably above about 40° C. These conditions define a supercritical condition of carbon dioxide whereby the coating agent is solubilized in the supercritical carbon dioxide.

With the coating agent being solubilized in the supercritical fluid, the coating agent diffuses into inter-graphene spaces to possibly expand or swell these spaces. The step of diffusing the coating agent into the spaces between the graphene layers includes maintaining diffusion for between about 10 minutes to 24 hours (preferably 3 hours) at supercritical conditions to produce tentatively intercalated graphite. The procedure further comprises catastrophically depressurizing the tentatively intercalated graphite to precipitate the coating agent from the supercritical fluid. During catastrophic depressurization, the supercritical fluid expands and exfoliates the graphite layers while the coating agent precipitates from the supercritical fluid to cover the layers.

Presumably, the low viscosity and high diffusivity of the supercritical fluid allows the coating agent solubilized therein to become intercalated between the graphene layers in the graphitic material under supercritical conditions, thereby possibly increasing the interlayer spacing. Upon depressurization, the supercritical fluid residing in the interstitial spaces rapidly expand and force the layers to exfoliate or delaminate from each other, and the coating agent previously solubilized in the supercritical fluid precipitates therefrom to deposit on the delaminated layers, preventing reformation of the van der Waals forces between graphene layers. That is, the coating agent precipitates from the supercritical fluid and attaches to the graphene layers.

Although this conventional route is useful in terms of producing pristine NGPs that are covered with a coating agent, one has to remove this coating agent unless the coating agent is desired for an intended application (e.g., for the preparation of a polymer matrix composite with the coating agent being the monomer or polymer for this matrix). For this particular purpose, it is advantageous to have a supercritical fluid containing a curing agent dissolved therein. The curing agent, typically a low molecular weight species, can penetrate into the inter-graphene spaces, along with the supercritical fluid. Upon-depressurization, the curing agent will precipitate out to cover the newly formed graphene surfaces. In addition to possibly acting to prevent the re-joining of graphene layers, the curing agent also serves to change the graphene surface properties, promoting the subsequent wetting of the graphene surface by a thermosetting resin (e.g., epoxide). Hence, the process further comprises mixing the curing agent-covered graphene material with a thermosetting resin.

In summary, after an extensive study, we have surprisingly observed that:
(1) Supercritical fluids containing no coating agent are at least as effective as those containing a coating agent for intercalating and exfoliating natural graphite. There is no major difference in the supercritical fluid temperature, pressure, time, and de-pressurization conditions between the two species (one with and the other without a coating agent);
(2) Supercritical fluids, with or without a coating agent dissolved therein, are effective in intercalating and exfoliating a wide variety of graphitic materials, including (in addition to natural graphite) artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB), graphitized soft carbon, and hard carbon. Previous studies on supercritical fluid delamination of graphite have been essentially limited to chemically pre-intercalated natural graphite [Ref. 55] and natural flake graphite only [Ref. 56].
(3) With proper conditions selected for supercritical fluid intercalation and exfoliation, one could readily obtain ultra-thin NGPs with a thickness less than 1 nm. With other less favorable conditions (e.g., a lower depressurization rate or gas discharge rate), somewhat thicker NGPs were obtained. However, these thicker NGPs could be subjected to another cycle of supercritical fluid intercalation and exfoliation, preferably in the same pressure chamber, to yield much thinner NGPs. By repeating the cycle one or two times we could readily obtain substantially single-layer NGPs.
(4) Supercritical fluids containing a surfactant dissolved therein are more effective than their counterparts containing a coating agent (e.g., polymer, monomer, and oil, as defined by Gulari, et al. [56]) or those containing no surfactant and no coating agent.
(5) The presently invented process is fast and environmentally benign.
(6) A functional group can be conveniently imparted to the resulting NGPs if a reactive chemical group is introduced into the pressure vessel to contact the NGPs therein before, during, or after NGPs are formed.

The following examples serve to provide the best modes of practice for the present invention and should not be construed as limiting the scope of the invention.

EXAMPLE 1

Preparation of Pristine NGPs from Natural Graphite Using $CO_2$ Supercritical Fluids A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure $CO_2$ by way of piping means and controlled or regulated by valves. A heating jacket was wrapped around the vessel to achieve and maintain the critical temperature of carbon dioxide. High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing $CO_2$ to diffuse into inter-graphene spaces. Then, the vessel was immediately depressurized "catastrophically' at a rate of about 3 milliliters per second. This was accomplished by opening a connected blow-off valve of the vessel. As a result, delaminated or exfoliated graphene layers were formed, which were identified as Sample 1-A. This sample was found to contain pristine NGPs with an average thickness just under 10 nm.

A small amount of NGPs was mixed with water and ultrasonicated for 15 minutes to obtain a suspension, which was then cast onto a glass surface to produce a thin film of approximately 89 nm in thickness. Based on a four-point probe approach, the electrical conductivity of the NGP film was found to be 889 S/cm.

EXAMPLE 2

Repeated Intercalation and Exfoliation with $CO_2$ Supercritical Fluids

Approximately two-thirds of Sample 1-A was removed from the pressure vessel. The remaining NGPs were subjected to another cycle of supercritical $CO_2$ intercalation and de-pressurization treatments (i.e., the above procedures were repeated with a pressure of 7.5 MPa and temperature 65° C.), yielding much thinner NGPs with an average thickness of 2.1 nm (identified as Sample 2). The specific surface area, as measured by the BET method, was approximately 430 $m^2/g$. TEM and AFM examinations indicated that there were many single-layer graphene sheets in this sample. The electrical conductivity of a thin film made from these ultra-thin NGPs was 1,450 S/cm.

EXAMPLE 3

Preparation of Pristine NGPs from Natural Graphite Using $CO_2$ Supercritical Fluids Containing a Surfactant Sample 3 was prepared under essentially identical supercritical $CO_2$ conditions as Sample 1-A, with the exception that a small amount of surfactant (approximately 0.05 grams of Zonyl® FSO) was mixed with 5 grams of natural graphite before the mixture was sealed in the pressure vessel. The resulting NGPs have a surprisingly low average thickness, 4.1 nm. After the pressurization and de-pressurization procedures were repeated for two more cycles, the resulting NGPs had an average thickness less than 1.0 nm, indicating that a majority of the NGPs were single-layer or double-layer sheets. The specific surface area of this sample after a repeated cycle was approximately 900 $m^2/g$. It may be noted that a sample of all single-layer graphene sheets should exhibit a specific surface area of >2,670 $m^2/g$. It is clear that the presence of a surfactant or dispersing agent promotes separation of graphene layers, perhaps by preventing the reformation of van der Waals forces between graphene sheets once separated.

Figure 1:
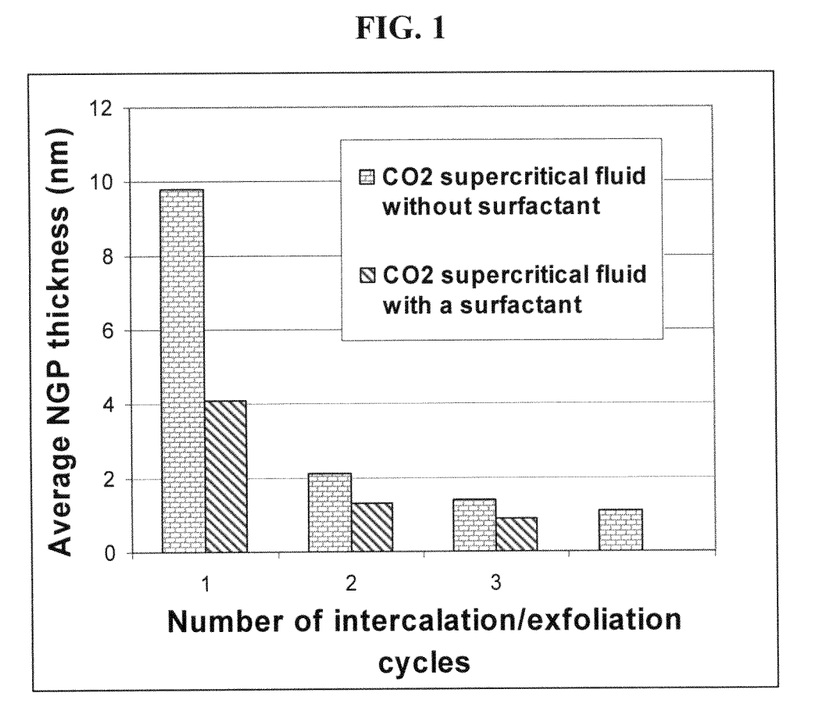
FIG. 1 The thickness of NGPs prepared with or without a surfactant dissolved in a supercritical fluid. The pressure vessel containing NGPs, after the first (initial) cycle of $CO_2$ supercritical fluid intercalation and exfoliation, was re-pressurized and de-pressurized for a number of cycles.

The thickness data for NGPs prepared in Examples 1-3 are summarized in FIG. 1, indicating the effectiveness of a surfactant in promoting exfoliation.

EXAMPLE 4

Supercritical Fluid Intercalation and Exfoliation of Graphite Fibers and MCMBs

Continuous graphite fiber yarns (Magnamite from Hercules) were cut into segments of 5 mm long and then ball-milled for 24 hours.

MCMB 2528 microbeads were supplied by Alumina Trading, which is the U.S. distributor for the supplier, Osaka Gas Chemical Company of Japan. This material has a density of about 2.24 g/cm$^3$; a particle size maximum for at least 95% by weight of the particles of 37 microns; median size of about 22.5 microns and an inter-planar distance of about 0.336 nm.

Figure 2A:
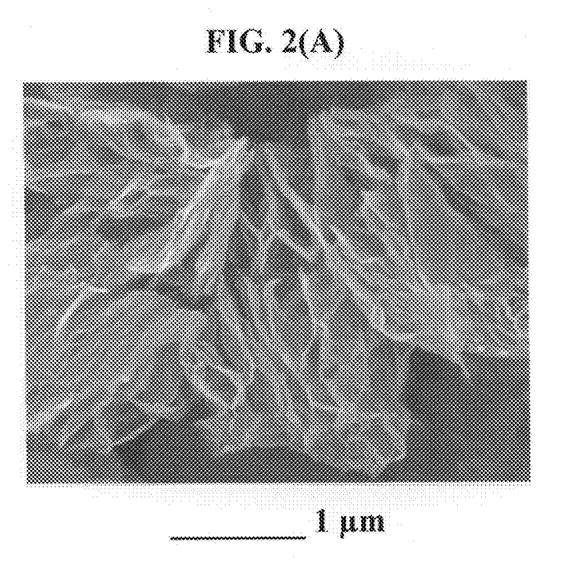
Figure 2B:
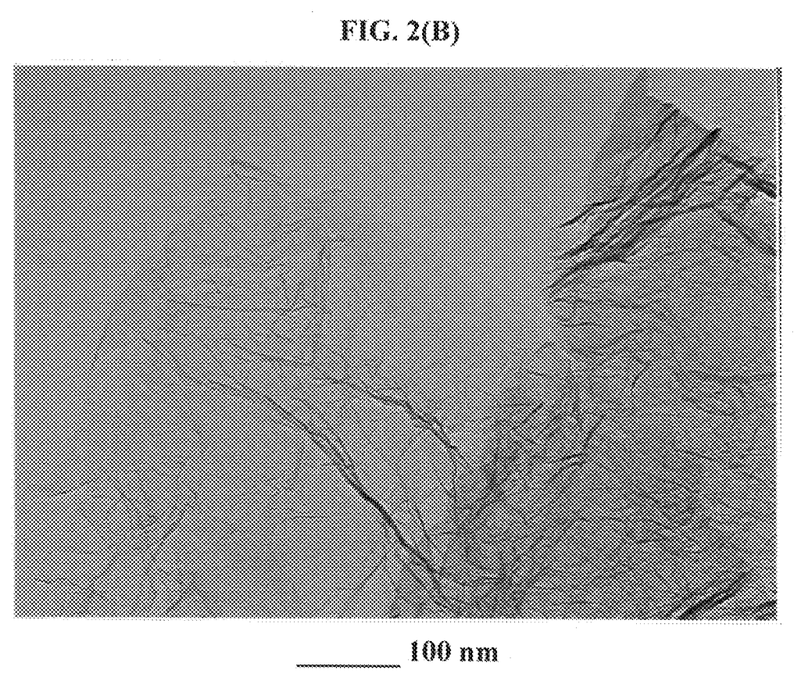
Figure 3A:
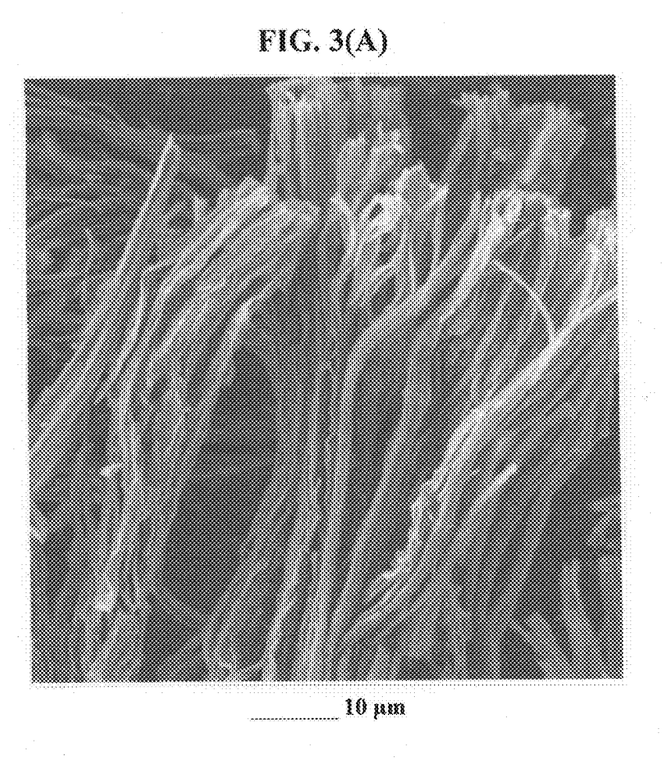
Figure 3B:
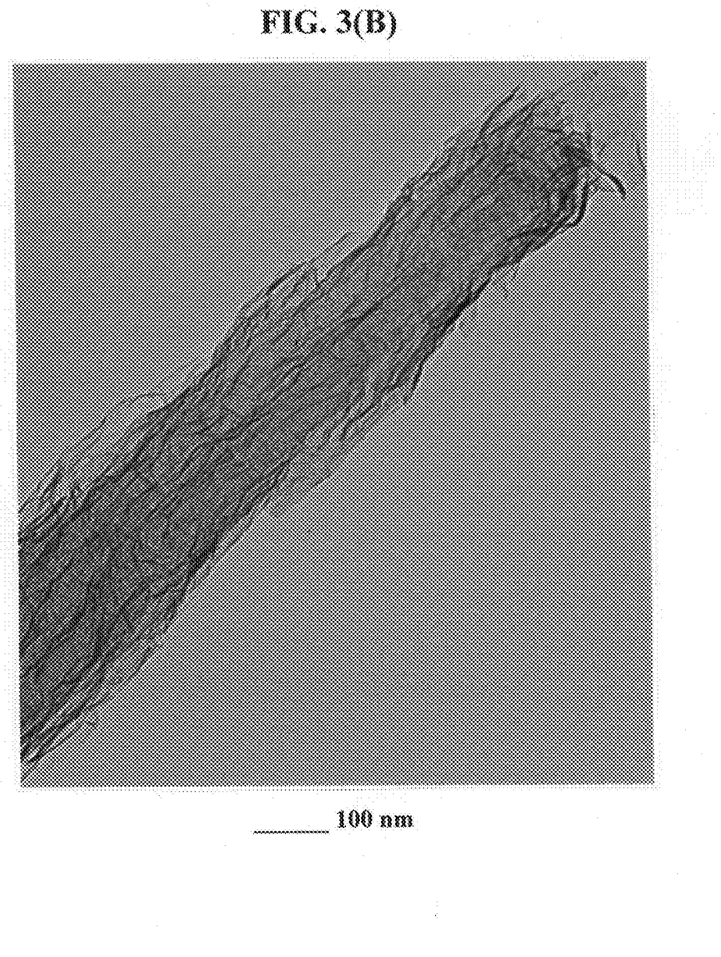

Approximately 5 grams of graphite fibers and 5 grams MCMBs were separately placed in a high pressure vessel, which was supplied with $CO_2$ gas through pipe means as in Example 1. The pressure at approximately 8.5 MPa was maintained while the vessel was heated to about 70° C. to achieve a supercritical condition of carbon dioxide. This intercalation process was proceeded for about 1 hour, followed by a sudden depressurization to the ambient pressure. The resulting expanded/exfoliated structure after the initial cycle for the MCMBs and graphite fibers are shown in FIG. 2(A) and FIG. 3(A), respectively. For each sample, the intercalation and exfoliation steps were repeated for another cycle. Representative TEM images of the resulting NGPs are shown in FIG. 2(B) and FIG. 3(B), respectively. The NGPs obtained from graphite fibers were found to have a length-to-width ratio greater than 10 and an average thickness of 7.6 nm. The NGPs from MCMBs were found to have an average thickness of 2.3 nm.

EXAMPLE 5

Supercritical Fluid Intercalation and Exfoliation of Graphite Oxide (GO)

Graphite oxide was prepared by oxidation of graphite flakes with sulfuric acid, sodium nitrate, and potassium permanganate at a ratio of 4:1:0.05 at 30° C. for 24 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

A curing agent, aliphatic amine (EPIKURE 3223), was mixed with the GO powder at a 1:1 weight ratio. The mixture was then placed in a pressure vessel and subjected to $CO_2$ supercritical fluid intercalation and exfoliation treatments under comparable conditions described in Example 1. After depressurization, the NGPs were naturally coated with the curing agent. Epoxy resin (EPON 828) was then mixed with the curing agent-coated NGPs at a ratio of 12 parts of curing agent with 100 parts of epoxy resin and cured at 60° C. for 24 hours to obtain an NGP nanocomposite.

EXAMPLE 6

Intercalation and Exfoliation of Graphite with a Supercritical Fluid Containing $SO_3$ $SO_3$ vapor was generated by adding and heating 10 g of fuming sulfuric acid into a reactor. The $SO_3$ vapor was passed through a column in which 10 g of MCMBs was packed for receiving $SO_3$. After exposure of MCMBs to $SO_3$ for one hour, the treated MCMB sample was placed in a pressure vessel. The vessel was supplied with $CO_2$ gas through pipe means as in Example 1. The pressure at approximately 8.5 MPa was maintained while the vessel was heated to about 70° C. to achieve a supercritical condition of carbon dioxide. Presumably $SO_3$ was dissolved in supercritical $CO_2$. This $CO_2/SO_3$ intercalation process was allowed to proceed for about 3 hours, followed by a sudden depressurization to the ambient pressure.

Upon completion of the procedure, the vessel containing NGPs was slightly heated at about 60° C. for about 15 minutes to remove excessive amount of $SO_3$ condensed on the surface of the NGPs, and the separated $SO_3$ was recovered and absorbed into the sulfuric acid in the reactor. $SO_3$-treated NGPs were washed with water and filtered. Surprisingly, $SO_3$-treated NGPs were found to be readily dispersible in water while the NGPs obtained from the same MCMBs without $SO_3$ were not dispersible in water. It appears that $SO_3$ has slightly oxidized or sufonated NGPs, imparting desirable functional groups thereto.

It is of significance to note that $SO_3$, $O_3$ (ozone) and $O_2$ are but a few examples of reactive species that can be included in a supercritical fluid for exfoliating and, essentially concurrently, functionalizing NGPs.

In summary, the presently invented process is superior to many prior art processes in several aspects:

1) Prior art processes based on graphite intercalation/oxidation and high-temperature exfoliation did not allow for a good control over the oxygen content of the resulting GO or NGP platelets. The presently invented process is capable of producing pristine NGPs that have never been exposed to oxidation.
2) In another commonly used prior art approach, the graphite oxide dispersed in an aqueous solution was reduced with hydrazine, in the presence of a polymer, such as poly (sodium 4-styrenesulfonate). This process led to the formation of a stable aqueous dispersion of polymer-coated graphene platelets. In some applications of NGPs, however, a polymer coating may be undesirable. Furthermore, the commonly used reducing agent, hydrazine, is a toxic substance.
3) Conventional processes of preparing GO nano sheets that included chemical exfoliation typically were extremely tedious. Such a long process is not amenable to the mass production of conductive nano graphene platelets.
4) The presently invented process is capable of producing NGPs with no or little impurity.

The process can obviate the need for washing and rinsing the platelets (which was required in the prior art solution approach to the exfoliation of GO and/or subsequent chemical reduction). The presently invented process is fast and environmentally benign.

5) The presently invented process is capable of producing ultra-thin NGPs, including those that are single graphene sheets.
6) This process allows for concurrently attaching a desirable functional group to the resulting NGPs (e.g., by simply introducing a desirable chemical species, such as $SO_3$, into the supercritical fluid). This is a powerful approach to varying the dispersibility or solubility of NGPs in a solvent.

The invention claimed is:

1. A process for producing a nano graphene platelet (NGP) material, said process comprising: (i) subjecting a graphitic material to a supercritical fluid at a first temperature and a first pressure for a first period of time in a pressure vessel, wherein said supercritical fluid contains no coating agent solubilized therein and no intercalating agent or oxidizing agent is used in the process, and said graphitic material comprises no previously intercalated graphite and said graphitic material is selected from the group consisting of natural graphite, artificial graphite, graphite oxide, graphite fluoride, graphite fiber, carbon fiber, carbon nano-fiber, carbon nano-tube, soft carbon, hard carbon, and combinations thereof; and then (ii) rapidly depressurizing said fluid at a fluid release rate sufficient for effecting exfoliation of said graphitic material to obtain said NGP material.

2. The process as set forth in claim 1 wherein said supercritical fluid comprises a fluid selected from carbon dioxide, water, water oxidation, hydrogen peroxide ($H_2O_2$), methane, ethane, ethylene, ozone, sulfonic group ($SO_3$), or a combination thereof.

3. The process as set forth in claim 1 further comprising a procedure of repeating step (i) and step (ii) that includes (a) subjecting said NGP material to a supercritical fluid at a second temperature and a second pressure for a second period of time in a pressure vessel and then (b) rapidly depressurizing said fluid at a fluid release rate sufficient for effecting further exfoliation of said NGP material.

4. The process as set forth in claim 3 wherein said second temperature differs from said first temperature or said second pressure differs from said first pressure.

5. The process as set forth in claim 1 wherein said supercritical fluid contains a surfactant or dispersing agent dissolved therein.

6. The process as set forth in claim 5 further comprising a procedure of repeating step (i) and step (ii) that includes (a) subjecting said NGP material to a supercritical fluid at a second temperature and a second pressure for a second period of time in a pressure vessel and then (b) rapidly depressurizing said fluid at a fluid release rate sufficient for effecting further exfoliation of said NGP material.

7. The process as set forth in claim 6 wherein said second temperature differs from said first temperature or said second pressure differs from said first pressure.

8. The process as set forth in claim 1 wherein said supercritical fluid contains a curing agent dissolved therein and the process further comprises mixing said nano graphene material with a thermosetting resin.

9. The process as set forth in claim 1 wherein said supercritical fluid contains a curing agent dissolved therein and the process further comprises a procedure of repeating step (i) and step (ii) and a procedure of mixing said graphene material with a resin.

10. The process as set forth in claim 1 wherein said nano graphene platelet material, when formed into a thin film with a thickness no greater than 100 nm, exhibits an electrical conductivity of at least 100 S/cm.

11. The process as set forth in claim 1 wherein said nano graphene platelet material, when formed into a thin film with a thickness no greater than 100 nm, exhibits an electrical conductivity of at least 1,000 S/cm.

12. The process as set forth in claim 1 wherein said nano graphene material has a specific surface area of approximately from 300 $m^2/g$ to 2,600 $m^2/g$.

13. The process as set forth in claim 1 wherein said nano graphene platelet material comprises single-layer graphene.

14. The process as set forth in claim 1, further comprising imparting a chemical group to said nano graphene material in said pressure vessel.

15. The process as set forth in claim 1, wherein said supercritical fluid comprises a reactive chemical group.

16. The process as set forth in claim 1, wherein said supercritical fluid comprises a reactive chemical group and a surfactant.

* * * * *